US012561494B2

(12) United States Patent
de Mattos et al.

(10) Patent No.: US 12,561,494 B2
(45) Date of Patent: Feb. 24, 2026

(54) LATENCY-CAPACITY-AND ENERGY-AWARE VNF PLACEMENT IN EDGE COMPUTING ENVIRONMENTS

(71) Applicant: EMC IP Holding Company LLC, Hopkinton, MA (US)

(72) Inventors: Douglas Paulo de Mattos, Rio de Janeiro (BR); Anselmo Luiz Éden Battisti, Rio de Janeiro (BR); Hugo de Oliveira Barbalho, Rio de Janeiro (BR); Ana Cristina Bernardo de Oliveira, Rio de Janeiro (BR); Flávia Coimbra Delicato, Rio de Janeiro (BR); Paulo de Figueiredo Pires, Rio de Janeiro (BR); Débora Christina Muchaluat Saade, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 1099 days.

(21) Appl. No.: 17/451,774

(22) Filed: Oct. 21, 2021

(65) Prior Publication Data

US 2023/0130420 A1 Apr. 27, 2023

(51) Int. Cl.
*G06F 30/20* (2020.01)
*G06F 111/10* (2020.01)

(52) U.S. Cl.
CPC .......... *G06F 30/20* (2020.01); *G06F 2111/10* (2020.01)

(58) Field of Classification Search
None
See application file for complete search history.

(56) References Cited

U.S. PATENT DOCUMENTS

| | | | | |
|---|---|---|---|---|
| 2021/0311769 A1* | 10/2021 | Lahlou | .................. | G06F 9/5077 |
| 2021/0314418 A1* | 10/2021 | Abdul Wahab | ....... | G06F 9/5088 |
| 2021/0409335 A1* | 12/2021 | Zhu | ......................... | H04L 47/24 |

OTHER PUBLICATIONS

I. Benkacem, T. Taleb, M. Bagaa, and H. Flinck, "Optimal VNFs Placement in CDN Slicing over Multi-Cloud Environment," IEEE J. Sel. Areas Commun., vol. 36, No. 3, pp. 616-627, 2018.
D. Zhao, D. Liao, G. Sun, and S. Xu, "Towards resource-efficient service function chain deployment in cloud-fog computing," IEEE Access, vol. 6, No. c, pp. 66754-66766, 2018.

(Continued)

*Primary Examiner* — Emerson C Puente
*Assistant Examiner* — Michael Paul Mirabito
(74) *Attorney, Agent, or Firm* — Workman Nydegger

(57) ABSTRACT

One example method includes creating an ILP model that includes a delay model, an energy model, and a QoS model, and modeling, using the integer linear programming model, a VNF placement problem as an ILP problem, and the modeling includes: using the delay model to identify propagation, transmission, processing, and queuing, delays implied by enabling an instance of the VNF at an edge node to accept a user VNF call; using the energy model to identify energy consumption implied by enabling an instance of the VNF at an edge node to accept a user VNF call; and using the QoS model to identify end-to-end delay, bandwidth consumption, and jitter, implied by enabling an instance of the VNF at an edge node to accept a user virtual network function call. The problem modeled by the ILP model may be resolved by a heuristic method.

16 Claims, 4 Drawing Sheets

(56) References Cited

OTHER PUBLICATIONS

A. Leivadeas, M. Falkner, I. Lambadaris, and G. Kesidis, "Optimal virtualized network function allocation for an SDN enabled cloud," Comput. Stand. Interfaces, vol. 54, pp. 266-278, 2017.

C. W. Tseng, F. H. Tseng, Y. T. Yang, C. C. Liu, and L. Der Chou, "Task Scheduling for Edge Computing with Agile VNFs On-Demand Service Model toward 5G and beyond," Wirel. Commun. Mob. Comput., vol. 2018, 2018.

M. Abu-Lebdeh, D. Naboulsi, R. Glitho, and C. W. Tchouati, "NFV orchestrator placement for geo-distributed systems," 2017 IEEE 16th Int. Symp. Netw. Comput. Appl. NCA 2017, vol. Jan. 2017, No. November, pp. 1-5, 2017.

Hawilo, Hassan; Jammal, Manar; Shami, Abdallah. Network function virtualization-aware orchestrator for service function chaining placement in the cloud. IEEE Journal on Selected Areas in Communications, 2019.

Dinh-Xuan, Lam, et al., Performance evaluation of service functions chain placement algorithms in edge cloud. International Teletraffic Congress. vol. 1. IEEE, 2018.

Luizelli, Marcelo Caggiani, et al., Piecing together the NFV provisioning puzzle: Efficient placement and chaining of virtual network functions. International Symposium on Integrated Network Management. IEEE, 2015.

Hmaity, Ali, et al., Latency-and capacity-aware placement of chained Virtual Network Functions in FMC metro networks. Optical Switching and Networking, 2020.

Leivadeas, A., Kesidis, G., Ibnkahla, M., & Lambadaris, I., (2019). VNF placement optimization at the edge and cloud. Future Internet, 11(3), 69.

Jiang, C., Fan, T., Gao, H., Shi, W., Liu, L., Cerin, C., & Wan, J., (2020). Energy aware edge computing: A survey. Computer Communications, 151, 556-580.

* cited by examiner

| | |
|---|---|
| MEMORY — 402 | STORAGE MEDIA — 408 |
| NVM — 404 | UI DEVICE — 410 |
| PROCESSOR — 406 | DATA STORAGE — 412 |
| APPLICATION(S) — 414 | |

LATENCY-CAPACITY-AND ENERGY-AWARE VNF PLACEMENT IN EDGE COMPUTING ENVIRONMENTS

FIELD OF THE INVENTION

Embodiments of the present invention generally relate to VNF (Virtual Network Function) placement in edge computing environments. More particularly, at least some embodiments of the invention relate to systems, hardware, software, computer-readable media, and methods for optimizing VNF placement based on multiple different objectives.

BACKGROUND

Network Function Virtualization (NFV) is a technology that virtualizes compute, network, and storage, resources to decouple the network functions from underlying hardware, thus allowing the software implementation of these functions to run on commodity hardware. By doing this, NFV may provide the necessary flexibility to enable agile, cost-effective, and on-demand service delivery models combined with automated management. The software implementation of network functions may be referred to as Virtual Network Function (VNF), and may run on a NFV Infrastructure (NFVI) that encompasses the necessary software and hardware to provide the expected functionality. Other technologies are usually used to reap the benefits introduced by NFV, such as cloud computing and edge computing. Edge computing extends the cloud paradigm by exploiting available resources, data and computing, at the network edge, thus reducing communication delay, network bandwidth consumption and increasing security and data privacy.

When integrating NFV and edge computing, VNF instances are deployed in hosts named edge nodes. This strategy facilitates the QoS (Quality of Service) fulfillment of time-critical applications, while taking advantage of the capabilities, often idle, of the various devices deployed at the edge of the network. Different management and orchestration challenges arise in this virtualized and distributed environment. A major challenge regards the selection of the most suitable edge nodes to deploy VNFs in order to meet requests sent by multiple users. This is called the VNF placement problem, and it must be done in a way that application QoS requirements are met, without violating the SLAs (Service Level Agreement), while also trying to optimize the use of service provider resources at the edge. No single optimal solution exists given that this is a multi-objective optimization problem, that is, an optimization problem with multiple and conflicting objectives. The number of entities involved, their high heterogeneity, and the dynamism of resource availability, make this problem even more challenging.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 4 discloses aspects of an example computing entity operable to perform any of the claimed methods, processes, and operations.

DETAILED DESCRIPTION OF SOME EXAMPLE EMBODIMENTS

Figure 1:
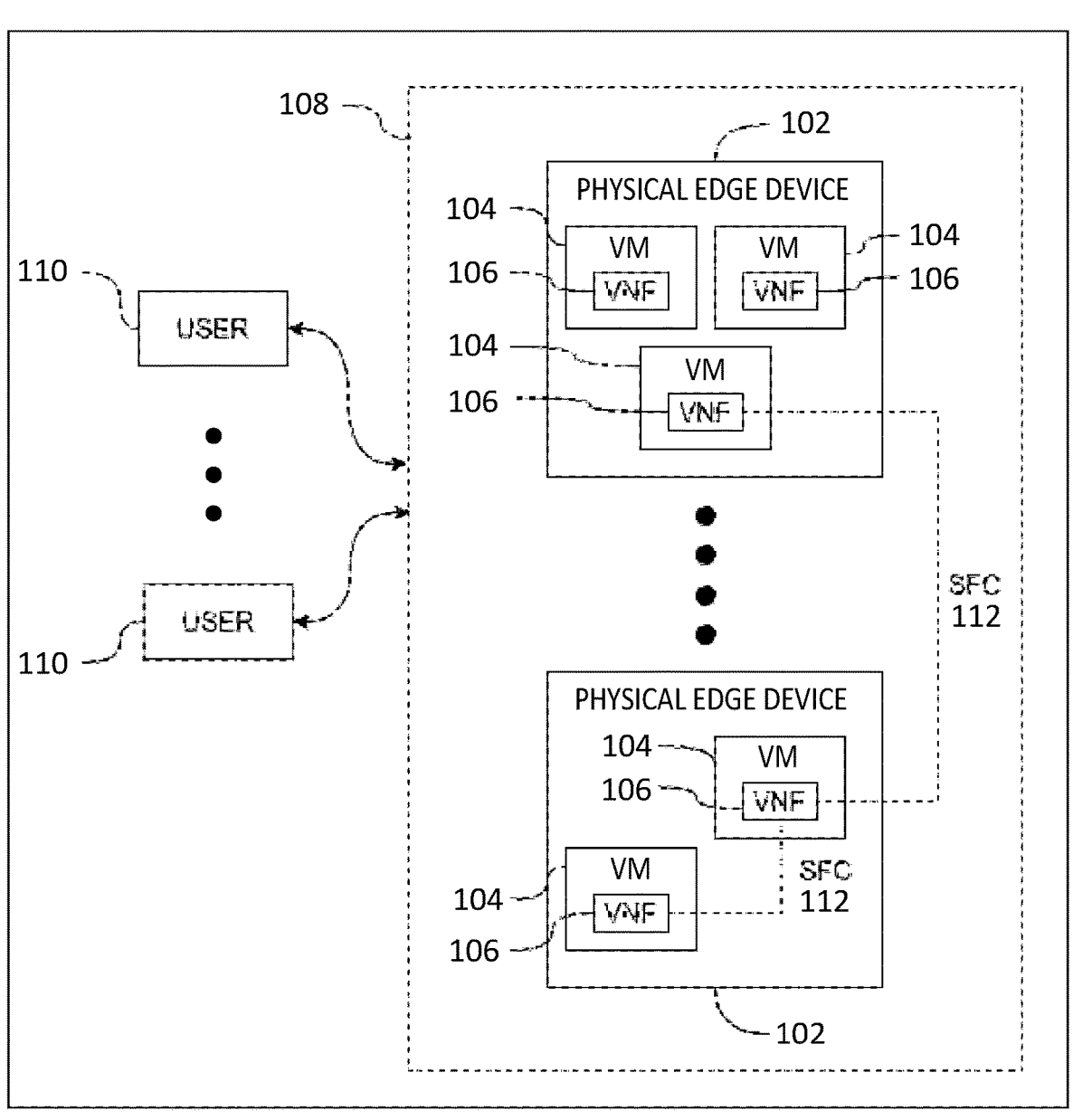
FIG. 1 discloses aspects of an example operating environment for some embodiments of the invention.

Embodiments of the present invention generally relate to VNF (Virtual Network Function) placement in edge computing environments. More particularly, at least some embodiments of the invention relate to systems, hardware, software, computer-readable media, and methods for optimizing VNF placement based on multiple different objectives.

In general, example embodiments of the invention may embrace VNF placement solutions that provide an integer linear programming (ILP) optimization model and a heuristic method, the latter with the goal to solve the VNF placement problem in a non-optimal, but faster, way. In some embodiments, the multi-objective optimization problem aims to (i) minimize the energy consumption in the edge nodes, (ii) minimize the total latency, and (iii) reduce the total cost of the infrastructure. Thus, example embodiments may address the VNF placement problem by taking these three objectives into account simultaneously. Example embodiments may also provide for the sharing of VNFs.

With reference first to the ILP optimization model, example VNF placement solutions according to some embodiments may be based on an ILP system model, which may be referred to herein simply as a 'system model,' that defines the edge environment entities, the delay, energy, and QoS models. In general, the ILP system model may aim to model the VNF placement problem with the aims of minimizing infrastructure costs such as computational and communication resource usage, minimizing end-to-end delay, and minimizing energy consumption, by the edge nodes, associated with operation of the VNF. As discussed in more detail elsewhere herein, an example ILP system model may define entities including users, edge nodes, VNFs, VNF instances, and service function chains (SFCs). Further, an ILP system model may comprise, for example, a delay model, an energy model, and a QoS model.

In more detail, the system model may define the entities User, Edge Node, VNF, VNF instance and SFC. The delay model may specify the propagation, transmission, processing, and queuing, delays. The energy model defines the power consumption generated by the VNF processing and data transmission between edge nodes. The QoS model defines the quality of service of SFC (Service Function Chain)s regarding the end-to-end delay, bandwidth and jitter. Such models aim at solving the VNF placement problem at the edge tier in an optimal way while minimizing, for example: SFC latency (such as in transmission, propagation, processing, and queueing); infrastructure cost (such as computational and communication resources); and, energy consumption in edge nodes. The resolution obtained with an ILP approach to the ILP problem may be an optimal approach, given the applicable constraints.

Once the VNF placement problem has been modeled as an ILP problem, the ILP problem may be resolved by a heuristic approach, example algorithms for which are disclosed herein. Resolutions obtained with the heuristic approach may be obtained relatively faster, but may be less optimal, than resolutions obtained using the ILP approach. In general, the heuristic approach may have a goal of creating a VNF placement plan that defines which VNF instances, whether existing or new instances, will process the VNFs of SFCs requested by users. The plan may be structured to meet user SLAs, and/or reduce resource and energy consumption in the edge computing environment. Thus, example implementations of a heuristic approach may answer the questions: how many VNF instances must be created; and, which edge nodes will execute each created VNF instance.

In more detail, example embodiments may be directed to solving a VNF placement problem using a heuristic approach. As such, example embodiments may operate to identify, and select, the most suitable edge node where to deploy, or place, each VNF. However, insofar as example embodiments may seek to exploit the sharing of VNFs, the heuristic algorithm may first try to assign a requested VNF to an already existing VNF instance, and in this case, since the existing instance is already in execution in a specific edge node, the problem may then become one of selecting the most suitable VNF instance to use.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that an embodiment may enable, and provide for, resource sharing among VNF instances. As another example, an embodiment may provide for latency-capacity-energy-aware placement of one or more VNF instances and in some instances, such placement may be optimized based on the aforementioned latency, capacity, and energy constraints. Various other advantageous aspects of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Example Problems

Placing different types of VNFs at the edge tier should consider the SFC requirements, users' SLA requirements, and the resources available in the infrastructure. Therefore, the VNF placement needs to deal with the heterogeneity of edge nodes' computational capacity and the SFC requirements. Moreover, the available resources in edge nodes are dynamic since VNFs consume CPU and memory when allocated in an edge node and free them up when they are removed from the nodes. In addition, VNFs consume bandwidth to communicate with other VNFs that make up part of the SFC, when placed in different nodes. In the VNF placement problem, another concern is the optimization of the resource usage. It may be important to be able to serve the maximum number of users without violating their SLAs.

As such, example embodiments, may address, and resolve, at least the following challenges: the decision-making for deploying VNFs taking into account the VNF requirement and SLAs; the heterogeneity and dynamism of available resources in edge nodes; and the heterogeneity of the SFC requirements. These are each discussed in more detail in the following sections.

A.1 Decision-Making for Deploying VNFs Considering VNF/SLA Requirements

When deploying the VNF instances into the edge tier, it may be desirable to select the most suitable edge nodes so that the SFC packets can traverse the VNFs to attend to user requests without violating the established SLA. The SLA may be defined per SFC, and may comprise the maximum acceptable end-to-end packet delay. The packet delay is the time difference between the packet ingress in the first VNF and its processing in the last VNF of the SFC. Additionally, given the dynamism of the workload and the potentially high number of edge nodes in the network, the placement decision needs to be done automatically. Also, this selection may consider the VNF requirements and optimize the use of service provider resources. Those requirements may include CPU and memory for processing the VNF in the edge node, and bandwidth regarding the traffic forwarding between the VNFs that make up an SFC.

A.2 Heterogeneity and Dynamism of Resources in Edge Environments

Edge nodes must provide the computational resources required by VNFs to succeed in hosting the VNFs. In other words, edge nodes must offer a capacity of CPU and memory to provide at least the minimum resources required by VNFs. Additionally, edge nodes should be able to provide the VNF type that is being requested. At the edge tier, there are edge nodes with different computational resource capacities, and that can provide different types of VNFs. Therefore, the edge environment has a high heterogeneity of available resources, such as CPU and memory for example, among the nodes. Also, VNFs must deal with a variety of bandwidth capacity of links among those nodes. The link bandwidth may be an important resource to be provided to SFCs since the SFCs may comprise a set of VNFs that are chained, which must be processed in a predefined order for the SFC processing success. Thus, not only the computational resources of edge nodes must be capable of supporting the VNF, but also the link bandwidth among them must be able to forward the traffic to the chained VNFs.

Moreover, edge nodes may vary their computational capacity as they host new instances and free up resources when some instance is removed. Consequently, the link bandwidth may vary as well. This dynamism of the computational resources of edge nodes and the link bandwidth, considered together with the heterogeneity of nodes and links, make the VNF placement a complex task.

A.3. Heterogeneity of the SFC Requirements

In addition to the variety of computational resource capacities edge nodes provide, SFCs and their VNFs also present different requirements. SFCs can demand different end-to-end delay tolerance, bandwidth, jitter, and SLA according to their VNF and objectives. Also, a single SFC may have different requirements depending on the user who is requesting it. Moreover, the VNFs that make up the SFC may request different CPU and/or memory capacities according to their functions in the SFC.

SFCs may also have multiple, and conflicting, priorities that should be addressed in the VNF placement solution. These priorities may regard, for example, latency, capacity, and energy consumption. If an SFC prioritizes the latency, the VNF placement approach should be aware of selecting edge nodes that better satisfy the VNF requirements regarding the delay for processing the VNF. Then, the other priorities should also be verified to serve the SFC according to the priority order. Therefore, these different priorities further contribute to increase the heterogeneity of SFCs and, thus, the complexity of VNF placement.

B. Overview

The demand for flexibility and quality of service (QoS) requirements in network services has been growing more and more. One of the emerging technologies that play a crucial role in delivering these new requirements is Network Function Virtualization (NFV). In general, NFV denotes the implementation, in software, of a network function, such as a firewall, intrusion detection, encryption, caching, network address translation, among others. Instead of being provided by dedicated hardware, such functions, referred to as VNF functions, are provided as software, and placed in virtual servers, that may be executed in commodity hardware. In many cases, services provided through the virtualization of network functions require that data flows go through a sequence of these functions in a defined order. A Service Function Chaining (SFC) denotes a sequence of VNFs designed to replace a chain of physical equipment that provide a complete functionality, that is, a service, required by a user.

In further detail, NFV aims to leverage the state-of-the-art technologies that virtualize compute, network, and storage resources to decouple the network functions from underlying hardware, thus allowing the software implementation of these network functions to run on commodity hardware. By doing that, NFV provides the necessary flexibility to enable agile, cost-effective, and on-demand service delivery model combined with automated management. This software implementation, namely Virtual Network Function (VNF), runs on a NFV Infrastructure (NFVI) that encompasses the necessary software and hardware components to provide the expected functionality. In many cases, services provided through the virtualization of network functions require that end-to-end data flows go through a sequence of these functions (probably in a defined order). Hence the concept of Service Function Chaining (SFC) emerges, to denote a chain of services, that is, a sequence of VNFs designed to replace a chain of physical equipment that provide complete functionality required by a user.

Other technologies are usually used to reap the benefits introduced by NFV. One of such technologies is cloud computing, which allows the deployment of VNFs as Virtual Machines (VMs) on data centers far from end-users. NFV and cloud computing can also work with other technologies towards providing a service-centric architecture. For example, the edge computing paradigm, in which services are repositioned closer to the end-users.

Edge computing extends the cloud computing paradigm by exploiting available resources, data and computing, at the network edge. Such a paradigm preserves the key benefits of using clouds as support infrastructures while moving part of the processing and storage capabilities to the network edge thus, closer to end-users and data sources. A significant benefit of edge computing is that it may reduce communication delay, relieve the use of network bandwidth, bring control decisions to the edge of the network and provide higher security and data privacy. Moreover, edge computing can take advantage of collaboration among devices to compensate for the lower resource capacity of each individual device. When integrating NFV and edge computing, VNF instances are deployed in hosts named edge nodes. Such a strategy facilitates the QoS fulfillment of time-critical applications, while taking advantage of the capabilities, often idle, of the various devices deployed at the edge of the network.

Different management and orchestration challenges arise in such virtualized and distributed environments. One of these challenges regards the placement of VNF in edge nodes, which may involve, among other things, selecting the most suitable edge nodes to deploy VNFs in order to meet requests for multiple applications and users. Typically, the component responsible for the placement is a Network Function Virtualization Orchestrator (NFVO). VNF placement should be performed in such a way that the QoS requirements of the applications are met, but without violating the SLAs, while also trying to optimize the use of service provider resources at the edge tier.

Note that no single optimal solution exists given that this is a multi-objective optimization problem, that is, an optimization problem, with multiple and conflicting objectives. The main entities involved in the problem are (i) Users requesting new SFCs, (ii) SFCs (Service Function Chain), (iii) VNF instances, that are VNFs in execution in the edge environment, and (iv) the edge nodes that provide computation resources for running the VNFs. The number of entities and their high heterogeneity and dynamism of resource availability make this problem even more challenging. Moreover, an edge node can execute multiple instances of one or more VNFs, and a single VNF instance can be shared by multiple applications. Additionally, every application request may have to traverse the VNF instances of the respective SFC.

Note that, for simplicity, in this disclosure, use of the term VNF can refer to a VNF type (e.g., firewall, proxy, etc.). Further, when the term 'instance' is used, that term refers to a VNF type instantiated and running in an edge node.

VNF orchestration and placement have been addressed in various studies, and different optimization models and heuristic solutions have been proposed for managing the VNF placement problem. In contrast, example embodiments may address the VNF placement problem by providing an integer linear programming (ILP) optimization model and a heuristic method in order to solve the problem in a non-optimal, but faster, way.

More specifically, in some example embodiments, consideration is given to the proposition, or condition, that that the users accessing the system have heterogeneous resources in terms of network latency and bandwidth in their links to the edge node. That is, the network latency and/or bandwidth may vary from one link to another at any given time, and may change over time. The edge nodes may have heterogeneous capacities in terms of CPU, memory, latency, and bandwidth. As well, each edge node may have a different subset of VNFs that users can request. Further, each VNF request may have a set of requirements that may have to be addressed. Some requirements may be intrinsically related to the VNF such as, for example, the minimum amount of CPU available in the edge node. Other requirements may be related to each specific request, for example, the maximum tolerable delay. Thus, example embodiments may also define that the VNF placement occurs after multiple user requests arrive. At to, all resources of the edge node may be available for running new VNF instances. Thus, VNF instance sharing may only occur among those already-placed VNF instances.

In at least some example embodiments then, and as noted earlier herein, the multi-objective optimization problem may aim to (i) minimize the energy consumption in the edge nodes, (ii) minimize the total latency, and (iii) reduce the total cost of the infrastructure. Thus, embodiments may embrace a formulation for the VNF placement problem that takes these three objectives into account simultaneously. Example embodiments may also provide for the sharing of VNFs.

C. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be employed in connection with systems, software, and components, that implement and/or use edge computing technologies and cloud computing technologies. Example cloud computing environments, which may or may not be public, include environments in which processing, data protection, and other services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment. Functions carried out in cloud computing environments may be performed by physical machines and/or virtual machines (VM). A cloud computing environment, which may include a cloud computing platform, may communicate with one or more edge nodes, such as edge devices for example, of an edge computing environment. One non-limiting example of an edge device that may operate as an edge node in connection with some example embodiments of the invention is the PowerEdge server by Dell.

With particular attention now to FIG. 1, one example of an operating environment for embodiments of the invention is denoted generally at 100. In general, the operating environment 100 may include various physical edge devices 102, each of which may function as an edge node operable to communicate with each other, as well as with a cloud computing environment and/or other environments. Each of the physical edge devices 102 may host one or more virtual machines (VM) 104, and one or more of the VMs 104 may host one or more VNFs 106. The number, and mix, of VNFs 106 may vary from one VM 104 to another and/or from one physical edge device 102 to another. The physical edge devices 102 may collectively define a logical group 108 with which one or more users 110 may communicate. Finally, one or more VNFs 106 within a single physical edge device 102 and/or across multiple physical edge devices 102, may constitute elements of an SFC 112 that may be invoked or requested by a user 110. Note that it is not required that a VNF be implemented in, or hosted by, a VM. In at least some embodiments, a VNF may be implemented as a container rather than being implemented in a VM. As such, and with reference to the example of FIG. 1, and the disclosed embodiments, any or all of the disclosed VMs may be replaced with a corresponding container.

D. Aspects of Some Example Embodiments

In general, to address the challenges noted herein, example embodiments of the invention are directed to a latency-capacity-and energy-aware VNF placement algorithm for edge environments. Embodiments may also provide an ILP optimization model to solve the VNF placement problem optimally. As well, example embodiments may provide a heuristic algorithm to overcome any non-scalability problems of the ILP model.

D.1 System Models and Notations

Example VNF placement methods employed by example embodiments for the VNF placement problem may be based on a system model that defines the edge environment entities, the delay, energy, and QoS models. The system model defines the entities User, Edge Node, VNF, VNF instance and SFC. The delay model specifies the propagation, transmission, processing and queuing delays. The energy model defines the power consumption generated by the VNF processing and data transmission between edge nodes. The QoS model defines the quality of service of SFCs regarding the end-to-end delay, bandwidth and jitter. In general, those models aim at solving the VNF placement problem at the edge tier in an optimal way while minimizing: SFC latency (transmission, propagation, processing, and queueing); infrastructure cost (computational and communication resources); and, energy consumption in edge nodes.

More particularly, example embodiments of the invention include a system model for the VNF placement problem that aims at minimizing (i) the total latency from the user request until the result of the requested service reaches the user, (ii) the energy consumption in the edge tier, and (iii) the total cost of computational and communication resources required to run the VNFs. This model may assume that the VNF placement problem is performed in the edge tier, that is, in an edge computing environment. This model may also consider that each user is associated with only one edge node and the service demands are from users directly to an edge node. In addition, in embodiments of the model, each VNF instance may be able to handle a maximum number of requests without consuming more host resources beyond the limits defined during the instance creation. If a limit of maximum requests is violated, there may be a penalty associated with that request.

The system model may represent and employ the following entities and attributes. The physical infrastructure may be represented as an undirected graph $G_r=(H, L)$, where H is a set of edge nodes that host virtual machines (VM) where VNF instances can be executed (see, e.g., FIG. 1) and L is a set of links between edge nodes. Each link $(h_1, h_2){\in}L$ has a bandwidth $b_{h_1,h_2}$, a delay $d_{h_1,h_2}$, and a loss rate $w_{h_1,h_2}$, where $h_1$ and $h_2{\in}H$.

H is the set of edge nodes that host virtual machines where VNF instances can be executed. Each edge node h has the following attributes. The attribute $g_h$ defines the Group of the host h; $c_h$ defines the CPU capacity of the host h; $m_h$ defines the memory capacity of the host h; $TR_h=c_h$, $m_h$ defines the total resources as a set at the host h; $ca_h$ defines the CPU available at the host h; $ma_h$ defines the memory available at the host h; $TRA_h=ca_h$, $ma_h$ defines the total resources as a set at the host h; $IM_h=vi_1, vi_2, \ldots, vi_n$, defines the list of VNF type images available at the host h, where $vi_n {\in}VI$.

The entity Logical Group symbolized as $g{\in}G$, a set of logical groups, defines a logical set of edge nodes. Each logical group g has the attributes: $c_g=\Sigma_{h{\in}g} c_h$, which defines the total CPU capacity of all hosts in the group g; $m_g=\Sigma_{h{\in}g} m_h$, that defines the memory capacity of all hosts in the group g; $TR_g=c_g$, $m_g$, which defines the total resources of the logical group g; $ca_g$, which defines the CPU available in the group g; $ma_g$, defines the memory available in the group g; $TRA_g=ca_g$, $ma_g$, which defines the total available resources as a set in the group g; $IM_g=vi_1, vi_2, \ldots, vi_n$, which defines the list of VNF type images available in the group g, where $vi_n {\in}VI$.

The users are represented by U. According to some embodiments, each user $u{\in}U$ may be associated with only one edge node $h{\in}H$. This association may have the following properties: bandwidth $b_{u,h}$, a delay $d_{u,h}$ and a loss rate $w_{u,h}$ between the user $u{\in}U$ and the host $h{\in}H$. Also, each user demands a set of SFCs s. This SFC set is defined as $SC_u=s_1, s_2, \ldots, s_n$, where $s_n {\in}S$.

VNFs are represented by the set V. Each VNF $v{\in}V$ may have the following attributes. The attribute $c_v$ defines the CPU minimum requirement; my defines the memory minimum requirement; $k_v$ defines the data lake requirement, which is an optional parameter; the attribute $mis_v$ defines the maximum number of SFC requests that the instance can accept. The value of this attribute is always greater than or equal to 1. When $mis_v=1$, it means that the instance is a non-shareable type of VNF.

$R_v=c_v$, $m_v$, $k_v$, which defines the total resources required by $v{\in}V$; $V_{s,u}$ defines the set of VNFs of the service s of the user u. In addition to the entity VNF, an entity is defined to represent the instances of a VNF v modeled as $i_v{\in}I_v$. Also, embodiments may define $IM_v$, which represents the set of hosts that contain the image of the VNF v. The entity SFC, which represents a chain of VNFs, also has various attributes. Therefore, each SFC $s{\in}S$ has the attribute SLAs to define its Service Level Agreement. This attribute contains the end-to-end delay tolerance $dt_s$; the bandwidth $b_s$ and the jitter $j_s$. Thus, $SLA_s=dt_s, b_s, j_s$. Table 1 and Table 2, below, summarize the various entities and their attributes, respectively.

TABLE 1

System Model Entities

| Entity | Description | Symbol |
|---|---|---|
| Edge Node | Virtual machines hosted in a physical edge, where the VNF is running. | H |

TABLE 1-continued

System Model Entities

| Entity | Description | Symbol |
|---|---|---|
| Logical Group | A list of Edge Nodes. | g |
| User | Users that request SFC. | U |
| VNF | Software that executes a network function or ahigh-level service. | V |
| VNF Instance | Instances of a VNF. | I |
| SFC | A Service Function Chain is a chain of VNFs. | S |

TABLE 2

Entity Attributes

| Symbol | Description |
|---|---|
| | Edge Node |
| $g_h$ | Logical Group of the host h |
| $C_h$ | CPU capacity of the host h |
| $m_h$ | Memory capacity of the host h |
| $TR_h$ | Total resources of the host h |
| $ca_h$ | CPU available of the host h |
| $ma_h$ | Memory available of the host h |
| $TRA_h$ | Total available resources of the host h |
| $IM_h$ | VNF images available in the host h |
| $I_h$ | The VNF Instances in the host h |
| | Logical Group |
| $C_g$ | Total CPU capacity of all hosts in the logical group g |
| $m_g$ | Total Memory capacity of all hosts in the logical group g |
| $TR_g$ | Total resources of the logical group g |
| $Ca_g$ | CPU available of the logical group g |
| $ma_g$ | Memory available of the logical group g |
| $TRA_g$ | Total available resources of the logical group g |
| $IM_g$ | VNF images available in the logical group g |
| | User |
| $b_{u,h}$ | Bandwidth between the user u and the host h |
| $d_{u,h}$ | Delay between the user u and the host h |
| $W_{u,h}$ | Loss rate between the user u and the host h |
| $SC_u$ | Set of SFCs of the user u |
| | VNF |
| $C_v$ | CPU minimum requirement of the VNF v |
| $m_v$ | Memory minimum requirement of the VNF v |
| $k_v$ | Data lake requirement of the VNF v |
| $R_v$ | Total minimum resources of the VNF v |
| $V_{s,u}$ | Set of VNFs of the service s of the user u |
| $i_v$ | Instance of the VNF v |
| $IM_v$ | Set of the hosts that contain the image of the VNF v |
| $mis_v$ | Defines the maximum number of requests that can be accepted by aVNF instance |
| $pck_v$ | The mean size of the output VNF packet |
| | Service Function Chain |
| $dt_s$ | End-to-end delay tolerance of the service s |
| $b_s$ | Bandwidth of the service s |
| $j_s$ | Jitter of the service s |
| $SLA_s$ | Service Level Agreement of the service s |

In the following discussion, delay, energy, and QoS, models are presented that are employed in some example embodiments of a VNF placement solution. These models are presented by way of example, and are not intended to limit the scope of the invention.

With reference first to a delay model, example embodiments of a delay model may consider four types of delay, namely: the propagation delay $dp_{h_1h_2}$ between two edge nodes $h_1$ and $h_2{\in}H$; the transmission delay $dtm_{h_1h_2}$, that represents the time needed to transfer packets from an edge node $h_1{\in}H$ to the outgoing link that sends the packets to other edge node $h_2{\in}H$; the processing delay $dprc_{v,h}$, which refers to the time needed to run a VNF instance $i_v$, where $v \in V$, in the host $h \in H$ for the arriving packets; and, the queuing delay $dq_{hi_v}$, which represents the time the packets spend in an edge node $h \in H$ waiting to be sent to the next edge node plus the time they spend to be processed by a VNF instance $i_v$. Table 3 summarizes these different delays and their respective notations.

TABLE 3

Types of Delay

| Symbol | Description |
|---|---|
| $dp_{h_1 h_2}$ | Propagation delay between the edge nodes $h_1$ and $h_2 \in H$ |
| $dtm_{h_1 h_2}$ | Transmission delay between the nodes $h_1$ and the outlink to the $h_2 \in H$ |
| $dprc_{v,h}$ | Processing delay of the VNF instance $i_v$ in the edge node $h \in H$ |
| $dq_{hi_v}$ | Queuing delay in the node $h \in H$ + queuing delay for a VNF instance $i_v$ |

Reference is next made to an energy model according to some example embodiments. In the example VNF placement solution, embodiments may also consider the energy consumption at the edge tier. Particularly, this energy model may consider energy consumption with communication among edge nodes and energy consumption for processing the VNFs.

Concerning the energy consumption with communication, embodiments may use the propagation delay with the power for edge nodes sending/receiving data to/from other edge nodes. Thus, communication consumption between two edge nodes $h_1$ and $h_2 \in H$ may be denoted as:

$$E_{h_1 h_2} = dp_{h_1 h_2} p_{h_1 h_2}$$

where $p_{h_1 h_2}$ is the power consumption in the communication between $h_1$ and $h_2 \in H$ and $dp_{h_1 h_2}$ is the propagation delay between the edge nodes $h_1$ and $h_2$. The energy consumption regarding the processing of VNFs at the instant time T by an edge node h may be defined as:

$$p_h(\tau) = p_h^{IDLE} + (p_h^{MAX} - p_h^{IDLE}) u_h(\tau)$$

where $p_h^{IDLE}$ is the consumed energy in the idle state of an edge node h at the time t, and $p_h^{MAX}$ is the consumed energy in the full state of an edge node h; and $u_h(\tau)$ is the utilization of the edge node h. Therefore, the processing consumed energy in the edge node h at the time slot t is:

$$E_h^{PROC} = \sum_t p_h(t) dt$$

Reference is next made to a QoS model according to some example embodiments. Regarding the QoS model proposed, embodiments may consider that a SFC $s \in S$ has a quality of service $Q_s$ that comprises an end-to-end delay tolerance $qdt_s$, a bandwidth $qb_s$ and a jitter $qj_s$. Thus, the quality of service may be defined as $Q_s = qdt_s, qb_s, qj_s$.

D.2 ILP Formulation

This section describes the ILP (Integer Linear Programming) formulation to the VNF placement problem in the edge tier upon the system model defined above. Example embodiments may employ an ILP formulation with the goals of minimizing: the computational and communication resource required; the end-to-end delay, or latency; and the energy consumption. Thus, some example formulations may define a multi-objective function that considers the delay, resource, and energy parameters.

In one example ILP formulation, embodiments may employ two decision variables that may be defined as follows:

$x_h^{ivsu}$: binary variable set to 1 if the instance i of the VNF v of the service s from the user u is allocated to run in the host h.

$k_h^i$: binary variable set to 1 if the instance i is allocated to run in the host h.

$y_{h_1 h_2}^{i^1 i^2}$: the amount of traffic between the instance $i_1$ and $i_2$, which are VNF instances routed over the link $(h_1, h_2) \in L$.

Based on the example disclosed delay model and the aforementioned decision variables, consider that the Computational Resource RCp:

$$R_{s,u}^{Cp} = \sum_{h \in H} \sum_{i \in I_h} (R_v / TR_h) . k_h^i, \ \forall \ v \in V,$$

which sums the total resource usage in the edge nodes for each VNF instance for each SFC of users. The communication resource $e \ R^{Cm}$:

$$R_{s,u}^{Cm} = \sum_{v \in V_{s,u}} \sum_{i \in I_v} \sum_{i^1 > 1, i^2 \in I_v} \sum_{(h_1, h_2) \in L} (b_{h_1 h_2}) . pck_{vi1} \cdot y_{h_1 h_2}^{i^1 i^2} \cdot \forall \ s \in SC_u . \forall \ u \in U,$$

which computes the total of communication resources spent among the VNF instances for each SFC of users.

$$\text{Processing Delay, } D_{s,u}^{Prc} = \sum_{v \in V_{s,u}} \sum_{i \in I_v} \sum_{h \in H} (dprc_{v,h}) . x_h^{ivsu}, \ \forall \ s \in SC_u . \forall \ u \in U,$$

which calculates the time spent for processing VNF instances for each SFC of the users.

$$\text{Queuing Delay, } D_{s,u}^{Qu} = \sum_{v \in V_{s,u}} \sum_{i \in I_v} \sum_{h \in H} (dq_h) . x_h^{ivsu}, \ \forall \ s \in SC_u, \ \forall \ u \in U.,$$

which calculates the time spent in the edge node queue for starting to process the VNF instances.

Propagation Delay, $$D_{s,u}^{Pp} = \sum_{v \in V_{s,u}} \sum_{i \in I_v} \sum_{i^1 > 1, i^2 \in I_v} \sum_{(h_1, h_2) \in L} (dp_{h_1 h_2}) . y_{h_1 h_2}^{i^1 i^2} \cdot \forall \ s \in SC_u, \ \forall \ u \in U,$$

which calculates the time spent for propagating data between the VNF instances that compose each SFC of users.

Transmission Delay, $$D_{s,u}^{Tm} = \sum_{v \in V_{s,u}} \sum_{i \in I_v} \sum_{i^1 > 1, i^2 \in I_v} \sum_{(h_1, h_2) \in L} (dtm_{h_1 h_2}) . y_{h_1 h_2}^{i^1 i^2} \cdot \forall \ s \in SC_u, \ \forall \ u \in U,$$

which calculates the time spent for transmitting data between the VNF instances that compose each SFC of users.

According to the energy consumption model discussed above, embodiments may add the energy consumption parameter in the propagation delay equation to compute the energy consumption regarding the propagation delay for a user U and a service S thus:

$$E_{s,u}^{p} = \sum_{v \in V_{s,u}} \sum_{i \in I_v} \sum_{i^1 > 1, i^2 \in I_v} \sum_{(h_1, h_2) \in L} dp_{h_1 h_2} \cdot p_{h_1 h_2} \cdot y_{h_1 h_2}^{i^1 i^2}$$

and:

$$E_{s,u}^{prc} = \sum_{v \in V_{s,u}} \sum_{i \in I_v} \sum_{h \in H} \left( p_h(t) \cdot x_h^{ivsu} \right), \forall s \in SC_u, \forall u \in U, \text{ at the slot time } t$$

Then, the multi-objective function may be defined as follows, $$\min \left( \sum_{u \in U} \sum_{s \in SC_u} \left( D_{s,u}^{Qu} + D_{s,u}^{Tm} + E_{s,u}^{p} + E_{s,u}^{prc} + R_{s,u}^{Cp} + R_{s,u}^{Cm} \right) \right)$$

for a user U and a service S. This multi-objective function aims to minimize the sum of the queuing and transmission delay, the energy consumption for processing VNFs and transmitting VNF data from edge nodes to their outgoing link. The processing and propagation delays are not explicitly in the function since the energy consumption calculation uses both of them.

The above multi-objective function is subject to the following constraints, namely, a VNF instance $i_v \in I_v$ may only be placed at a node h that contains its image $vi_v \in VI_v$.

$$\sum_{h \notin IM_v} x_h^{ivsu} = 0, \forall i \in I_v, \text{ where } v \in V, s \in S \text{ and } u \in U$$

The following constraint defines that the resources of the edge nodes will not be oversubscribed:

$$\sum_{v \in V} TR_v x_u^{ivsu} \le TR_h, \forall h \in H$$

Lastly, the following SLA constraint defines that a SFC SLA must be less than or equal to the Qs in the current time: $SLA_s \le Q_s, \forall s \in S$.

D.3 Latency-Capacity-and Energy-Aware Heuristic Policy

The heuristic algorithm aims at solving the VNF placement problem in a non-optimal, but possibly faster, way than the ILP optimization model. In general, the ILP model may not scale particularly well in environments that employ a large number of edge nodes, and serving a high number of user requests, although the ILP model may work well in environments with a relatively small number of edge nodes and requests. On the other hand, a heuristic model may scale well, possibly due to relaxation of some constraints, and may thus be well suited for operating environments that include a large number of edge nodes. Thus, example embodiments may model the overall VNF placement problem as an ILP problem, but such example embodiments may solve the problem using the heuristic approach disclosed herein.

As the ILP optimization, the heuristic policy may meet the user SFC SLA, the application (VNF) requirements, and also optimize the use of the edge tier infrastructure. As the ILP formulation, the heuristic policy may also consider the latency, capacity, and energy, to select the most appropriate edge nodes to place the VNF requests. The policy implemented in some embodiments may be a static and offline approach in which all the SFC requests are known in advance. As input, the algorithm may have a set of SFCs, composed of different VNF types requested by users. The algorithm output may comprise a mapping between the VNF instances, which may be already-placed VNF instances and/or new VNF instances, and the VNF requests of the user SFCs.

In more detail, a VNF placement algorithm may determine in which VNF instance, hosted by an edge node, each VNF request of the SFCs of users is accepted. Finding a solution for the VNF placement problem by considering all SFCs together in the decision problem increases the complexity of the problem due to the exponentially many combinations of placements that exist. To overcome this issue, this heuristic approach may solve the placement problem for one SFC at a time. Note that different solutions may be found depending on the order that SFCs are chosen to be solved. In this example heuristic, the SFCs may be iterated in ascending order of latency requirement, although the iteration may additionally, or alternatively, be based on the other requirements and constraints disclosed herein.

Once the SFC to be placed is chosen, the heuristic may select the chain of VNF instances that will be used by a request for that SFC. Then, following the VNFs' order in the SFC, the heuristic may either reuse a VNF instance that is already instantiated in an edge node of the network, or the heuristic may create a new VNF instance in an edge node. In other words, example embodiments of the heuristic algorithm may comprise two phases, namely: Phase 1, which exploits already-placed VNF instances; and, Phase 2, which places any new VNF instances, if necessary. Both Phases 1 and 2 may rely on an evaluation metric to sort a list of candidate entities to associate the current VNF v with. In the Phase 1, a candidate entity is an existing instance of such VNF that has not exceeded the maximum amount of sharable SFCs. As for Phase 2, a candidate entity is a virtual edge node (host) that the NFVO has verified as possible for placement.

The evaluation metric described in this disclosure is a convex combination of the entity's attributes: latency delay ($L_e$), resource capacity availability ($R_e$), and energy availability ($E_e$). More precisely, $Eval(e)=w_1*E_e+w_2*R_e-w_3*L_e$, where $w_1+w_2+w_3=1$ and $w_i \ge 0$, $\forall i \in 1,2,3$. Note that the weights may be determined and assigned by a network administrator to set up the heuristic to prioritize one attribute, or group of attributes, over one or more other attributes.

E. Example Methods

It is noted that any of the disclosed processes, operations, and methods—including those of FIGS. 2 and 3 discussed below, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Figure 2:
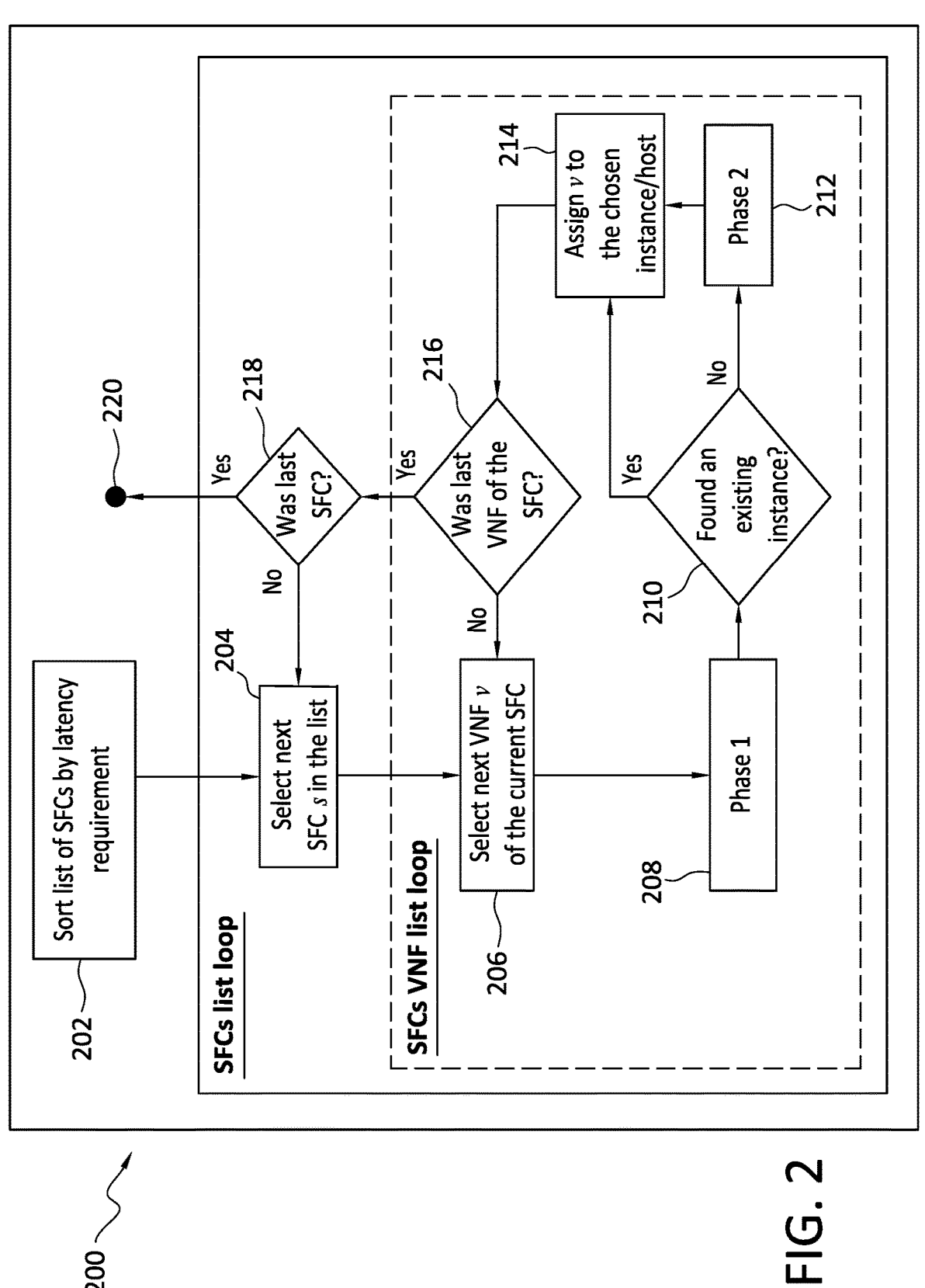
FIG. 2 discloses an overview of an example heuristic method according to some example embodiments.

Directing attention now to FIG. 2, an overview of various operations of an example heuristic method 200 is disclosed. The example method 200 may be performed in whole, or in part, at an edge node, at a group of edge nodes, or at a cloud computing site. In some embodiments, any one or more operations of the method 200 may be performed at one or more edge nodes, and any one or more other operations of the method 200 may be performed at a cloud computing site. Thus, the example method 200 may be performed entirely at an edge node or group of edge nodes, entirely at a cloud computing site, or may be performed cooperatively by one or more edge nodes and a cloud computing site. All of the foregoing considerations apply as well to the method 300, discussed below. The scope of the invention is not limited to any particular functional allocation however, and the foregoing are presented only by way of example.

The example method 200 may begin by sorting 202 a list of SFCs by their respective latency requirements. Then, an SFC list loop may be entered, and one or more next SFCs in the list may be selected 204. After the selection 204, an SFC VNF list loop may be entered, and a next VNF v of the current SFC may be selected 206.

Now, Phase 1 of the example method 200 may be entered 208. As shown, Phase 1 may include an inquiry 210 whether an existing VNF instance has been found. If not, Phase 2 may be entered 212, and the method 200 may advance to 214 where a new instance may be assigned to a selected instance/ host. On the other hand, if an existing VNF instance has been found, the method 200 may advance to 214 where that existing instance may be assigned to a selected instance/ host.

In either case, after a VNF instance has been assigned at 214, the method 200 may advance and a determination 216 may be made as to whether or not the VNF that was assigned 214 is the last VNF of an SFC requested by a user. If so, the method 200 may advance and a determination 218 may be made as to whether or not that SFC was the last SFC requested by the user. If so, the method 200 may terminate 220.

With reference again to 216, if the determination 216 was made that the VNF that was assigned at 214 is not the last VNF of the SFC requested by the user, the method 200 may return to 206. Finally, and with reference again to 218, if the determination 218 was made that the SFC was not the last SFC requested by the user, the method 200 may return to 204. Phase 1 and Phase 2 may continue until all VNFs for all SFCs have been assigned.

Figure 3:
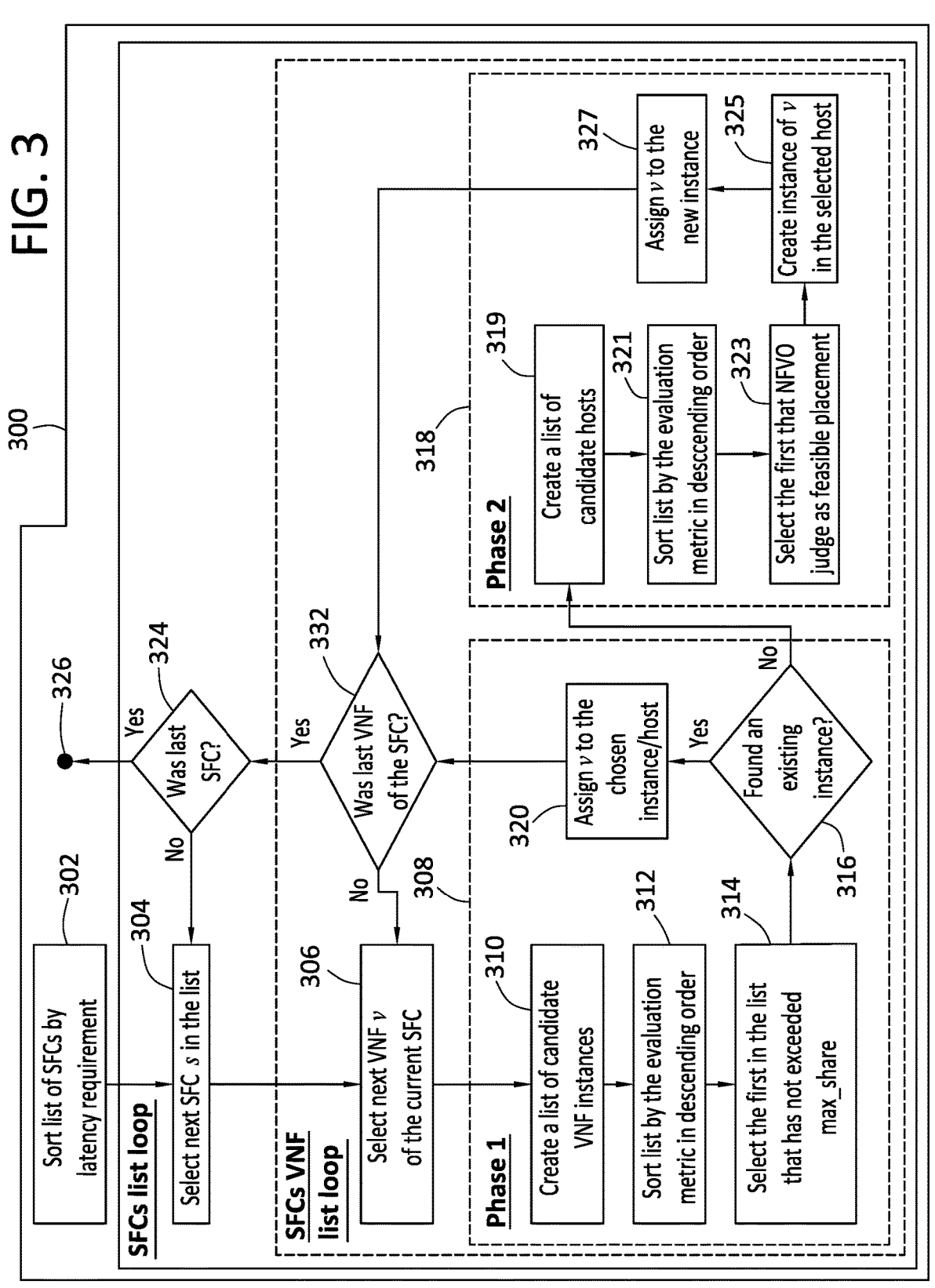
FIG. 3 discloses a detailed view of an example heuristic method according to some example embodiments.

With the discussion of FIG. 2 in view, attention is directed now to the example method 300 of FIG. 3, where the example method 300 may comprise a heuristic approach. The example method 300 may begin by sorting 302 a list of SFCs by their respective latency requirements. Then, an SFC list loop may be entered, and one or more next SFCs in the list may be selected 304. After the selection 304, an SFC VNF list loop may be entered, and a next VNF v of the current SFC may be selected 306.

Now, Phase 1 of the example method 300 may be entered 308. As shown, Phase 1 may include creating 310 a list of candidate VNF instances. The candidate VNF instances may then be sorted 312 by a specified evaluation metric, in ascending order. No particular evaluation metric is necessarily required and the evaluation metric used for sorting may be specified by an administrator, or may have a default value, such as latency for example. After the sorting 312, the first candidate VNF in the list that has not exceeded the maximum extent to which it can be shared may be selected 314.

Next, a determination 316 may be made as to whether or not there is an existing instance of that VNF. If not, the method 300 may exit Phase 1 and enter 318 Phase 2, discussed in further detail below. On the other hand, if a determination 316 is made that there is an existing instance of the VNF, the VNF may be assigned to that instance 320. The method 300 may then exit Phase 1. After exiting Phase 1, the method 300 may advance and make a determination 322 as to whether or not the VNF that was assigned was the last VNF of an SFC requested by a user. If not, the method 300 may return to 306. If so, the method 300 may advance and make a further determination 324 as to whether or not the SFC to which the VNF was assigned is the last SFC requested by a user. If so, the method 300 may terminate 326, and if not, the method 300 may return to 304.

As noted above, the method 300 may enter 318 Phase 2 if no existing instance of a VNF is determined to exist at 316. After entry 318 into Phase 2, the method 300 may next create 319 a list of candidate hosts for a VNF instance. The list of candidate hosts may then be sorted 321 by an evaluation metric, which may or may not be the same as the evaluation metric used at 312, in descending order. After sorting 321, the method 300 may select 323 the first candidate in the list that the NFVO judges as feasible for placement of a VNF instance. The VNF instance may then be created in the selected host 325, and a VNF assigned 327 to that VNF instance. After this assignment 327, the method 300 may return to 322. Phase 1 and Phase 2 may be repeated until all SFCs have been populated with the required VNFs.

As will be evident from this disclosure, and the particular examples of FIGS. 2 and 3, at least some example embodiments directed to the VNF placement problem may be based on the formulation of the placement problem as an optimization problem, solved through ILP. When the VNF placement problem disclosed herein is NP-hard, then optimization approaches such as ILP may only be able to find feasible solutions for small-scale edge systems, and ILP may have limited scalability. As such example embodiments may also comprise a heuristic approach for the VNF placement problem to address large-scale systems. The example disclosed ILP model may thus act as a solver for small-scale SFC/edge environments, as well as acting as a benchmark for the heuristic solution.

F. Further Discussion

It will be apparent from this disclosure that example embodiments of the invention may provide various useful aspects and advantages. One such aspect concerns resource sharing among VNF instances. Particularly, disclosed embodiments of a heuristic algorithm may enable resource sharing among multiple VNF instances by exploiting already-placed VNF instances before creating new VNF instances. The algorithm may be based on a model that defines an attribute to specify the maximum number of VNF requests an instance of this VNF type can accept simultaneously. When a VNF instance accepts more than one VNF request, those requests may share the computational resource allocated for that VNF instance in the edge node. This resource sharing among VNFs may reduce the computational resource usage since the request uses the resource allocated to the VNF instance serving it. Also, this aspect may optimize the use of well-positioned edge nodes by concentrating several requests in the same edge node.

Another aspect of some example embodiments concerns latency-capacity-and energy-aware VNF placement. For example, embodiments of the disclosed heuristic algorithm may target different application QoS, while also decreasing cost for the infrastructure provider. To this end, the algorithm may be aware of latency, computational resource capacity, and energy consumption. Therefore, the algorithm may select edge nodes for placing VNF requests by verifying those characteristics in the candidate edge nodes. In one example system model, each SFC has a list that defines the priority order considering latency, capacity, and energy. Thus, embodiments of the algorithm may search for candidate nodes according to the SFC priority. For instance, if an SFC prioritizes first the energy consumption, the heuristic algorithm may search for nodes that consume less energy than the other nodes.

A further aspect of some example embodiments relates to energy awareness. To illustrate, the energy consumption of edge nodes may be important for guaranteeing QoS due to the power constraints at those edge nodes. This energy consumption may include energy required for tasks such as, but not limited to, data generation, transmission, aggregation, storage, and processing tasks. Typical approaches in the edge computing environment focus on a single objective, such as low computational resource usage, low latency, or low energy consumption. In contrast, example embodiments of a VNF placement solution may join multiple, disparate, objectives in an optimization model. The heuristic aims to minimize the end-end delay, computational and communication resource usage, the energy consumption. In fact, the disclosed energy model discussed herein considers the energy consumed for propagating data along with communication links and for processing the VNF requests in edge nodes. Thus, the proposed heuristic may select edge nodes with low energy consumption according to the SFC priority, where such priorities may include latency, capacity, and energy.

Example embodiments may implement still other aspects, such as a comprehensive delay model. In this regard, conventional VNF placement solutions only consider a propagation delay. In contrast however, example embodiments may consider at least four different communication delays in the disclosed delay model, namely, transmission delay, propagation delay, processing delay, and queueing delay. Thus, example embodiments of the heuristic algorithm may make relatively more accurate decisions regarding latency since those decisions may account for a range of delays and delay types.

An aspect of some example embodiments relates to VNF placement decision based on application priority. Particularly, SFCs may have different QoS requirements related to the end-end delay tolerance, bandwidth, and jitter. Thus, achieving a proper balance of those multiple QoS requirements may be important to implement in a solution to the VNF placement problem. Embodiments of the disclosed heuristic algorithm may allow this balance to prioritize one of the requirements according to the SFC demand. Moreover, the solution implemented by some embodiments may prioritize applications according to the payment plan of the user.

A final example of aspects that may be included in example embodiments concerns the logical grouping of edge nodes. Particularly, example embodiments may define logical groups that specify sets of edge nodes to enhance the search for suitable nodes to host VNF requests. Each logical group may have attributes to define the total CPU and memory capacity of all hosts in the logical group, the CPU and memory available in the logical group, and the VNF images available in the logical group. Thus, the logical group may provide an overview of the resource capacity of its constituent elements, that is, the edge nodes, thereby minimizing the search cost by avoiding unnecessary iteration through the edge nodes that make part of the group.

G. Further Example Embodiments

Following are some further example embodiments of the invention. These are presented only by way of example and are not intended to limit the scope of the invention in any way.

Embodiment 1. A method, comprising: creating an integer linear programming model that defines, and includes, a delay model, an energy model, and a QoS (Quality of Service) model; and modeling, using the integer linear programming model, a virtual network function placement problem as an integer linear programming problem, and the modeling comprises: using the delay model to identify propagation, transmission, processing, and queuing, delays implied by enabling an instance of the virtual network function at an edge node to accept a user virtual network function call; using the energy model to identify energy consumption implied by enabling an instance of the virtual network function at an edge node to accept a user virtual network function call; and, using the QoS model to identify end-to-end delay, bandwidth consumption, and jitter, implied by enabling an instance of the virtual network function at an edge node to accept a user virtual network function call.

Embodiment 2. The method as recited in embodiment 1, wherein the integer linear programming model defines, and uses as inputs in the modeling, a user, an edge node, the virtual network function, the virtual network function instance, and a service function chain that includes the virtual network function.

Embodiment 3. The method as recited in any of embodiments 1-2, wherein the integer linear programming problem is expressed as a multi-objective function whose solution minimizes: latency of a service function chain that includes the virtual network function; computational and communication resources required by the virtual network function; and, energy consumption by the virtual network function.

Embodiment 4. The method as recited in any of embodiments 1-3, further comprising using a heuristic method to solve the virtual network function placement problem modeled by the integer linear programming model.

Embodiment 5. The method as recited in embodiment 4, wherein the virtual network function placement problem is solved more quickly by the heuristic method than by the integer linear programming model.

Embodiment 6. The method as recited in embodiment 4, wherein a solution to the virtual network function placement problem obtained by the heuristic method is less optimal than a solution the virtual network function placement problem obtained by the integer linear programming model.

Embodiment 7. The method as recited in embodiment 4, wherein a solution to the virtual network function placement problem obtained by the heuristic method specifies in which virtual network function instance, hosted by one of the edge nodes, a virtual network function request, of the service function chain of a user, will be accepted.

Embodiment 8. The method as recited in embodiment 4, wherein the heuristic method creates a candidate list of existing virtual network function instances, sorted by an evaluation metric, and either: assigning the virtual network function to an existing virtual network function instance; or, creating a new instance of the virtual network function, and assigning the virtual network function to the new virtual network function instance.

Embodiment 9. The method as recited in embodiment 8, wherein assignment of the virtual network function is based on any one or more of: the delays; energy consumption; and QoS.

Embodiment 10. The method as recited in claim 8, wherein the virtual network function instance to which the virtual network function is assigned shares computational resources with another virtual network function instance.

Embodiment 11. A method for performing any of the operations, methods, or processes, or any portion of any of these, disclosed herein.

Embodiment 12. A computer readable storage medium having stored therein instructions that are executable by one or more hardware processors to perform operations comprising the operations of any one or more of embodiments 1-11.

H. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include edge computing environments that may comprise one or more nodes, where each node may comprise hardware and/or software. Each of such nodes may thus define an edge node of the edge computing environment. Some embodiments may operate in connection with cloud computing environments where one or more of a client, server, or other machine may reside and operate in a cloud environment.

Figure 4:
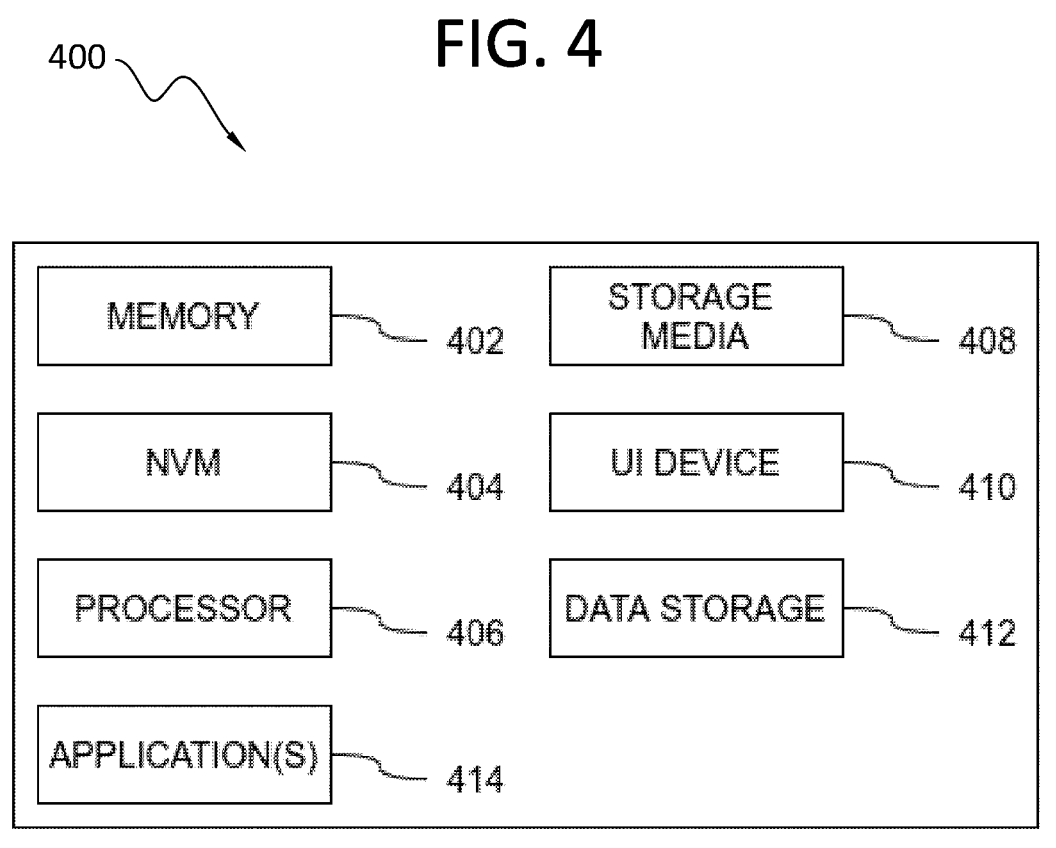

With reference briefly now to FIG. 4, any one or more of the entities disclosed, or implied, by FIGS. 1-3 and/or elsewhere herein, may take the form of, or include, or be implemented on, or hosted by, a physical computing device, one example of which is denoted at 400. As well, where any of the aforementioned elements, such as a VNF for example, may be hosted by, or implemented as, a container. In other embodiments, a VNF may be hosted by or implemented as, a virtual machine (VM) (see FIG. 1, for example) that may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

creating an integer linear programming model that defines, and includes, a delay model, an energy model, and a QoS (Quality of Service) model; and modeling, using the integer linear programming model, a virtual network function placement problem as an integer linear programming problem, and the modeling comprises:

creating a list of candidate virtual network function instances;

using the delay model to identify propagation, transmission, processing, and queuing delays implied by enabling an instance of the virtual network function at an edge node to accept a user virtual network function call;

using the energy model to identify energy consumption implied by enabling an instance of the virtual network function at an edge node to accept the user virtual network function call, wherein the energy consumption is identified based on a communication consumption obtained by multiplying the propagation delay and a power consumption in communication between the edge node and a next edge node, consumed energy in an idle state of the edge node, consumed energy in a full state of the edge node, and utilization of the edge node;

using the QoS model to identify end-to-end delay, bandwidth consumption, and jitter, implied by enabling an instance of the virtual network function at an edge node to accept the user virtual network function call;

sorting the list of candidate virtual network function instances by an evaluation metric based on the delay model, the energy model, and the QoS model in ascending order;

creating a candidate list of candidate hosts for the virtual network function instances;

sorting the candidate list of candidate hosts by the evaluation metric based on the delay model, the energy model, and the QoS model in descending order;

assigning a first candidate host in the list for placement of the virtual network function instance; and creating a new instance of the virtual network function in the first candidate host, and assigning the virtual network function to the created new virtual network function instance.

2. The method as recited in claim 1, wherein the integer linear programming model defines, and uses as inputs in the modeling, a user, an edge node, the virtual network function, the virtual network function instance, and a service function chain that includes the virtual network function.

3. The method as recited in claim 1, wherein the integer linear programming problem is expressed as a multi-objective function whose solution minimizes: latency of a service function chain that includes the virtual network function; computational and communication resources required by the virtual network function; and, energy consumption by the virtual network function.

4. The method as recited in claim 1, wherein the virtual network function placement problem is solved more quickly by a heuristic method than by the integer linear programming model.

5. The method as recited in claim 1, wherein a solution to the virtual network function placement problem obtained by a heuristic method is less optimal than a solution to the virtual network function placement problem obtained by the integer linear programming model.

6. The method as recited in claim 1, wherein a solution to the virtual network function placement problem obtained by a heuristic method specifies in which virtual network function instance, hosted by one of the edge nodes, a virtual network function request, of a service function chain of a user, will be accepted.

7. The method as recited in claim 1, wherein assignment of the virtual network function is based on any one or more of: the delays; energy consumption; and QoS.

8. The method as recited in claim 1, wherein the virtual network function instance to which the virtual network function is assigned shares computational resources with another virtual network function instance.

9. A computer readable storage medium having stored therein instructions that are executable by one or more hardware processors to perform operations comprising:

creating an integer linear programming model that defines, and includes, a delay model, an energy model, and a QoS (Quality of Service) model; and modeling, using the integer linear programming model, a virtual network function placement problem as an integer linear programming problem, and the modeling comprises:

creating a list of candidate virtual network function instances;

using the delay model to identify propagation, transmission, processing, and queuing delays implied by enabling an instance of the virtual network function at an edge node to accept a user virtual network function call;

using the energy model to identify energy consumption implied by enabling an instance of the virtual network function at an edge node to accept a user virtual network function call, wherein the energy consumption is identified based on a communication consumption obtained by multiplying the propagation delay and a power consumption in communication between the edge node and a next edge node, consumed energy in an idle state of the edge node, consumed energy in a full state of the edge node, and utilization of the edge node;

using the QoS model to identify end-to-end delay, bandwidth consumption, and jitter, implied by enabling an instance of the virtual network function at an edge node to accept the user virtual network function call;

sorting the list of candidate virtual network function instances by an evaluation metric based on the delay model, the energy model, and the QoS model in ascending order;

creating a candidate list of candidate hosts for the virtual network function instances;

sorting the candidate list of candidate hosts by the evaluation metric based on the delay model, the energy model, and the QoS model in descending order;

assigning a first candidate host in the list for placement of the virtual network function instance; and creating a new instance of the virtual network function in the first candidate host, and assigning the virtual network function to the created new virtual network function instance.

10. The computer readable storage medium as recited in claim 9, wherein the integer linear programming model defines, and uses as inputs in the modeling, a user, an edge node, the virtual network function, the virtual network function instance, and a service function chain that includes the virtual network function.

11. The computer readable storage medium as recited in claim 9, wherein the integer linear programming problem is expressed as a multi-objective function whose solution minimizes: latency of a service function chain that includes the virtual network function; computational and communication resources required by the virtual network function; and, energy consumption by the virtual network function.

12. The computer readable storage medium as recited in claim 9, wherein the virtual network function placement problem is solved more quickly by a heuristic method than by the integer linear programming model.

13. The computer readable storage medium as recited in claim 9, wherein a solution to the virtual network function placement problem obtained by a heuristic method is less optimal than a solution to the virtual network function placement problem obtained by the integer linear programming model.

14. The computer readable storage medium as recited in claim 9, wherein a solution to the virtual network function placement problem obtained by a heuristic method specifies in which virtual network function instance, hosted by one of the edge nodes, a virtual network function request, of a service function chain of a user, will be accepted.

15. The computer readable storage medium as recited in claim 9, wherein assignment of the virtual network function is based on any one or more of: the delays; energy consumption; and QoS.

16. The computer readable storage medium as recited in claim 9, wherein the virtual network function instance to which the virtual network function is assigned shares computational resources with another virtual network function instance.

* * * * *